A. F. COOPER.
CAR-WHEEL.
No. 187,967. Patented March 6, 1877.
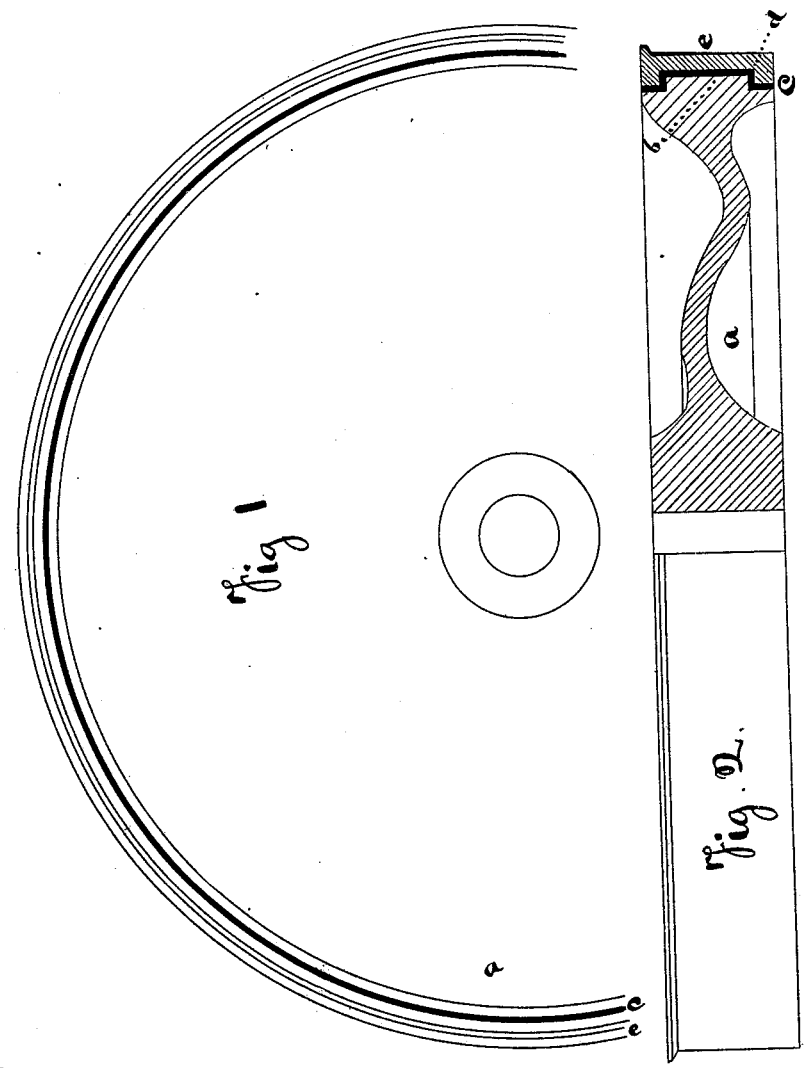

UNITED STATES PATENT OFFICE.

ALMOND F. COOPER, OF CAMBRIDGE, MASSACHUSETTS.

IMPROVEMENT IN CAR-WHEELS.

Specification forming part of Letters Patent No. 187,967, dated March 6, 1877; application filed September 29, 1876.

*To all whom it may concern:*

Be it known that I, ALMOND F. COOPER, of Cambridge, in the county of Middlesex and Commonwealth of Massachusetts, have invented an Improved Construction of Railroad Car Wheels, of which the following is a specifiation:

This invention consists in making a railroad-car wheel with a solid hub, web, and rim or tread, all in one piece, with a rib or projection on the middle of the face of the rim or tread about three-eighths to one-half an inch high, extending to within about an inch of either side, there presenting a shoulder—a steel tire corresponding in the form of its inner side to the form of the face of the rim or tread of the wheel, as described, having a depression to receive the projection on the wheel, but about one-quarter of an inch deeper and wider, and the inside diameter of the tire about half inch greater than the outside diameter of the wheel. In its natural state the tire would not go onto the wheel, as the shoulder on the inside of it would meet the shoulder of the rib or projection on the face of the rim or tread of the wheel, the smallest inside diameter of the tire being one-quarter to three-eighths of an inch less than the diameter of the wheel, measuring across the rib or projection.

The tire, being heated to a red heat, expands enough to enable it to go onto the wheel, and, when it is contracted by cooling, the projection on the wheel enters the depression in the inner side of the tire, on all sides of the wheel, about an eighth to three-sixteenths of an inch, the tire and the wheel thus engaging each other, so that they are locked together, and cannot be taken apart without expanding the tire again by heat. There is then a space between the tire and the wheel of about a quarter of an inch. The wheel with the tire on is then placed in a receiver shaped like a pan, with a standard in its center to enter and fill exactly the hole through the hub, which should be bored out, the outer rim of the receiver being made exactly of a diameter to receive the tire. Thus the tire and the wheel are secured in their relative positions to each other, so that the annular space around the wheel, between it and the tire, is equal and uniform all around. The openings on the sides of the wheel, between the tire and the wheel, are then closed by an annular plate placed and fastened on over the opening on the upper side of the receiver, the receiver itself being so formed that it closes the opening between the tire and wheel on the under side of the wheel. Then india-rubber properly prepared for the purpose, and for vulcanizing in a soft and plastic state, is forced by pressure, with any suitable apparatus, into the space between the tire and the wheel until it is completely filled. Then the india-rubber is vulcanized to a proper degree of hardness. The wheel is then complete and ready to apply to use.

In making the wheel the molding may and should be done with sufficient care and skill to obviate any necessity of turning off the tread, and the steel tire will be rolled so accurately that it will require no finishing on the inner side.

In the drawing annexed, Figure 1 is a partial side view of my wheel, and Fig. 2 represents a half-sectional view of it.

*a* is the hub, web, and rim or tread, in one solid piece of casting. *b* is the rib or projection on the face of the rim or tread. *c* is the vulcanized india-rubber packing. *d* is the depression or recess on the inner side of the tire, and *e* represents the steel tire.

I am aware that vulcanized india-rubber has been used in railroad-car wheels, between the hub and the tread, in many different forms and ways, and that its use cannot now be claimed broadly, nor in any of the many different forms in which it has been patented and used; and also that india-rubber has been injected into the wheel and vulcanized there; and also that railroad-car wheels have been made with cast-iron central portion, both in parts and whole, with steel tires, and packed with vulcanized india-rubber; and, therefore, do not claim any of these as new and my invention; but I do claim as new and my invention—

A railroad-car wheel consisting of a central portion, including the hub, web, and rim, made of cast or wrought iron in one solid piece, a steel tire, and an india-rubber packing between the wheel and its tire, when the wheel and the tire are made to interlock and engage each other, in the manner or substantially as described.

ALMOND F. COOPER.

Witnesses:
CHS. HOUGHTON,
W. H. YOUNG.